United States Patent [19]
Alexander

[11] 3,748,738
[45] July 31, 1973

[54] SUPPORT MEANS FOR RECIPROCATING SAW BLADE

[75] Inventor: Carl J. Alexander, Moorepark, Mich.

[73] Assignee: Wells Manufacturing Corporation, Three Rivers, Mich.

[22] Filed: Dec. 13, 1971

[21] Appl. No.: 207,409

[52] U.S. Cl. .................................. 30/394, 83/821
[51] Int. Cl. ............................................ B27b 19/08
[58] Field of Search .............. 143/68 E, 68 F, 68 R, 143/63 R, 163 R, 160 R; 30/192, 193, 194; 83/783, 613, 821

[56] References Cited
UNITED STATES PATENTS
2,784,751   3/1957   Alexander ........................ 143/68 E
2,895,514   7/1959   Wright ............................. 143/163 R Primary Examiner—Donald R. Schran
Attorney—Gordon W. Heuschen et al.

[57] ABSTRACT

A power-driven reciprocating saw comprising a motor having a housing, a blade support arm secured on the housing at one end and provided with a blade holder at the outer end thereof, a saw blade bearing against the support member, and means drivingly connecting the blade with the motor so as to impart reciprocating motion to the blade, are disclosed.

5 Claims, 4 Drawing Figures

PATENTED JUL 31 1973 3,748,738

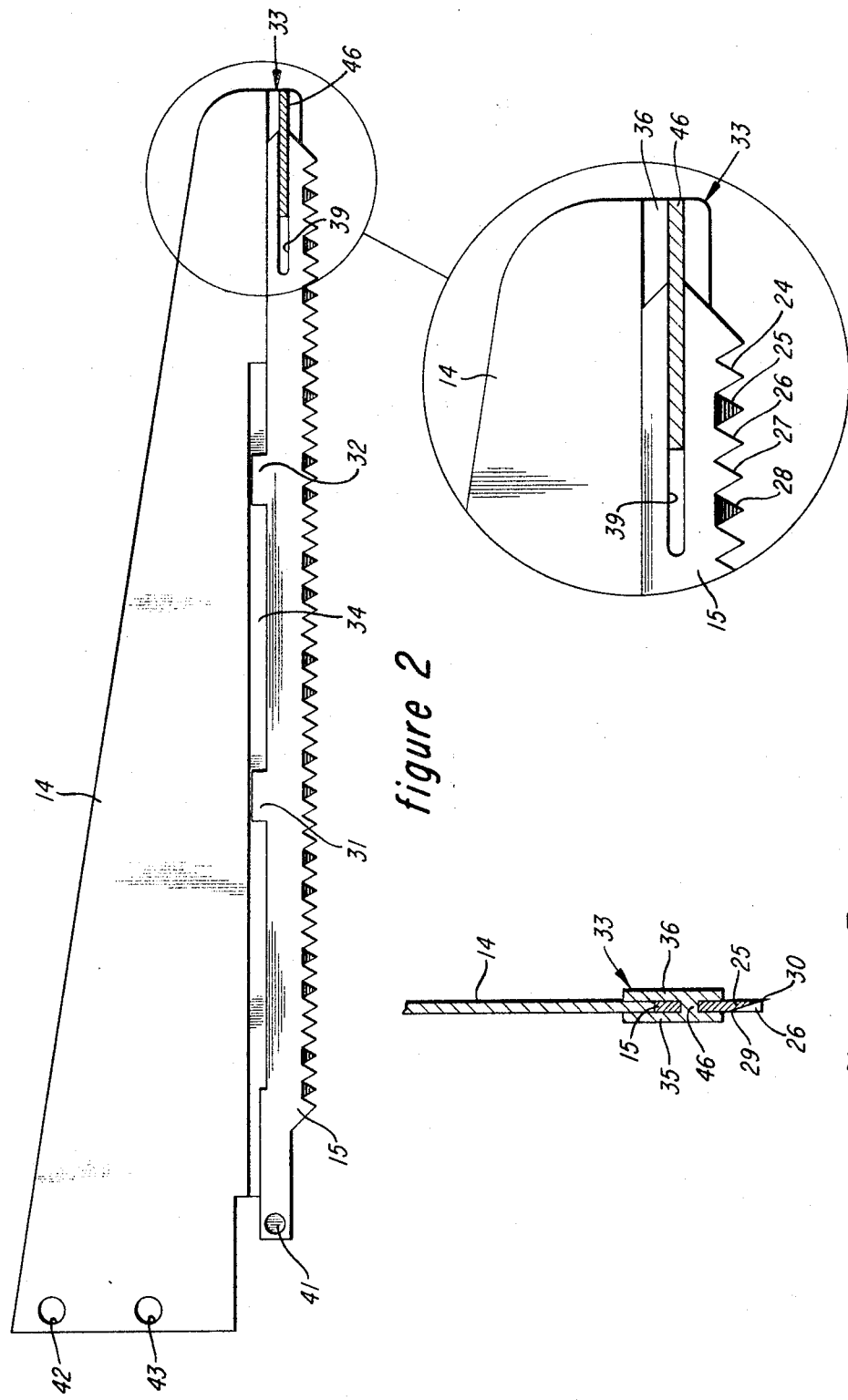

SUPPORT MEANS FOR RECIPROCATING SAW BLADE

BACKGROUND OF THE INVENTION

This invention is directed to a power-driven reciprocating saw provided with a supported blade.

The present invention is an improvement of the blade support means for reciprocating saw and blade combinations of the type disclosed in U.S. Pat. No. 2,784,751 and U.S. Pat. No. 2,895,514. The herein disclosed blade support means provides efficient cutting action over the entire blade length with a minimum of applied pressure, and extends cutting ability of the blade to its very end. Moreover, the blade is readily removable from the saw, thus the present improvement provides substantial versatility and efficient operation because a dull blade can be quickly replaced thus assuring a virtually continuous availability of the saw for use.

SUMMARY OF THE INVENTION

The present invention contemplates a power-driven reciprocating saw provided with a blade support member which is secured to the motor housing for the saw and which projects outwardly therefrom. The blade support member is provided with a central tongue along one longitudinal edge thereof and with a blade holder at the outer end thereof. The blade holder comprises a pair of juxtaposed tabs for receiving a saw blade therebetween which are affixed to the support member and which depend therefrom, and a transverse connector integral with the tabs and spaced from the blade support member.

The saw blade for the present reciprocating saw has cutting teeth along one longitudinal edge of the blade and is provided with a groove and with outwardly projecting, substantially coplanar lugs along the other longitudinal edge thereof, and with an open-ended longitudinal slot at one end of the blade. The tongue of the blade support member engages the groove of the blade and bears against the groove. The lugs engage the support member and lap alongside the tongue. The tabs of the blade holder receive substantially the width of the blade therebetween and the transverse connector joined to the tabs engages the longitudinal slot of the blade.

Reciprocal motion is imparted to the blade by a motor situated within the motor housing and drivingly connected to the blade.

BRIEF DESCRIPTION OF THE DRAWINGS

In the drawings,

FIG. 2 is a side elevation partially in section of a support member and a saw blade of this invention, with a portion thereof enlarged to show detail;

FIG. 3 is a cross-sectional view of the saw blade shown in FIG. 1 taken along line III — III.

DESCRIPTION OF THE PREFERRED EMBODIMENTS

Figure 1:
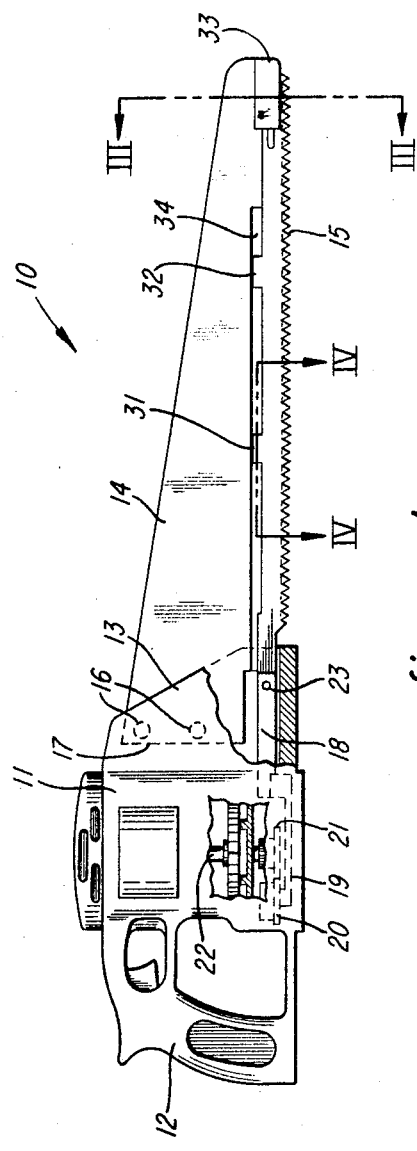
FIG. 1 is a side elevation view of the reciprocating saw with a blade support of this invention, partially broken away to show detail.

Referring to FIG. 1, reciprocating saw 10 comprises a motor housing 11 provided with a handle 12 on one side thereof and an upright, outwardly projecting rib 13 on the other side thereof. Blade support member 14 is situated in slot 17 of rib 13 and projects outwardly therefrom, removably secured to rib 13 by screws 16. Blade 15 bears against support arm 14 and is reciprocated by arm 18 journaled in housing 11 near lower end of rib 13 and is connected by connecting rod 19 to crank gear 20 which is driven from gear 21 mounted on motor shaft 22. Arm 18 is removably secured to blade 15 by a suitable set screw 23 or the like. Blade holder 33 is affixed to support arm 14 at the outer end thereof.

As shown in FIG. 2, blade 15 is an elongated metal strip provided with a pair of cutting teeth 24 and 25 on one side of raker tooth 26 and a pair of cutting teeth 27 and 28 on the other side of raker tooth 26. While all teeth on the blade can be the same length, preferably the raker teeth are somewhat shorter than the cutting teeth as shown in FIG. 3 where raker tooth 26 is shorter than cutter tooth 25. This reduces substantially the pressure necessary on blade 15 in order to make a cut. Cutter teeth 24 and 25, and also 27 and 28, are beveled on opposite sides of the tooth so as to provide a cutting line on both sides of the kerf which is then cleaned out by the raker tooth 26 that follows. A full bevel extending from the gullet 29 to the point 30 of a tooth (FIG. 3) is preferred, since this provides ample space to contain the resulting chips which are transported away from the cutting zone and out of the kerf by the reciprocating motion of blade 15; however, less than a full bevel, for example a half-bevel or a three-quarter bevel, can also be used.

As stated hereinabove, adjacent cutter teeth on each side of a raker tooth are provided with an opposite bevel. Each raker tooth must be flanked with at least a pair of cutter teeth on each side; however, three or more cutter teeth on each side can also be utilized, depending on the stroke of the blade. In the more preferred embodiment of this invention, consecutive cutter teeth are provided with an opposite bevel, i.e., the cutter teeth immediately flanking a raker tooth on each side have opposite bevels. It has been found that most effective cutting is achieved in this manner. If desired, the cutter and raker teeth can be outwardly set.

Lugs 31 and 32 are provided substantially coplanar and integral with blade 15 on the side of the blade opposite that bearing the teeth. The lugs are adapted to engage and lap tongue 34 of support member or arm 14.

Blade holder 33 comprises a pair of juxtaposed tabs such as tabs 35 and 36 and transverse connector 46, preferably in the shape of a longitudinal bar, fixed therebetween but spaced from support arm 14. Transverse connector 46 is received in open-ended longitudinal slot 39 which is cut in the outer end of blade 15. The outer end of blade 15 is, of course, received between tabs 35 and 36 which extend substantially over the width of blade 15, i.e., excluding the cutting teeth portion.

Figure 4:
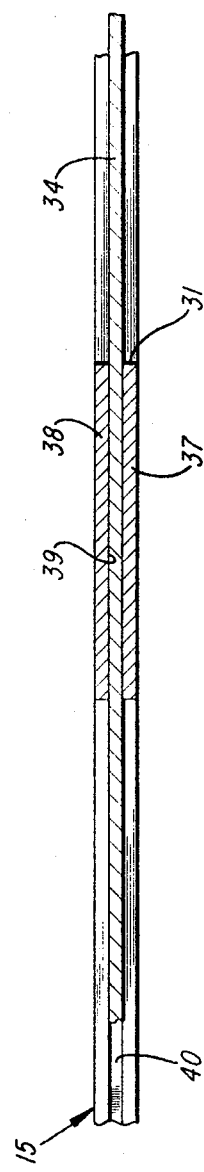
FIG. 4 is an enlarged top view of a portion of the blade shown in FIG. 1 along line IV — IV.

As shown in FIG. 4 for lug 31, support arm 14 is received in central slot 39 and leaves 37 and 38 each lap one side of tongue 34 which also engages and bears against groove 40 extending longitudinally along the upper edge of blade 15.

Blade 15 is connected to the drive means by setscrew 23 which is adapted to engage recess 41. Openings 42 and 43 are adapted to receive screws 16 therethrough.

Blade holder 33 of this invention provides several advantages over blade mounting means heretofore utilized in the art. Tabs 35 and 36 of holder 33 guide the outer end of blade 15 as the latter reciprocates during a cutting operation and keep blade 15 from bending when a harder, solid mass is encountered while making a cut. In addition, the cutting ability of the blade is extended to the very end thereof. Also, the relatively large surface area of the tabs and the transverse connector serve as an effective heat sink and effectively minimize the overheating of the blade and its mounting means during a period of extensive use.

The foregoing discussion and the accompanying drawings are intended as illustrative but are not to be taken as limiting. Still other variations and rearrangements of parts within the spirit and scope of this invention will readily present themselves to the skilled artisan.

I claim:

1. A power-driven reciprocating saw comprising
a motor having a housing provided with a handle on one side and a rib on the other side thereof;
a blade support member secured at one end in a slot in said rib and projecting outwardly therefrom, and provided with a central tongue along one longitudinal edge thereof and at the outer end of the blade support member with a blade holder which comprises a pair of juxtaposed tabs for receiving a saw blade therebetween affixed to and depending from the support member and a transverse connector integral with said tabs and spaced from the blade support member;
a saw blade having cutting teeth situated along one longitudinal edge thereof and provided with a groove and outwardly projecting substantially coplanar lugs along the other longitudinal edge thereof, and with an open-ended longitudinal slot at one end of the blade; said tongue of the support member engaging the groove of said blade and bearing thereagainst, said lugs engaging said support member and lapping alongside the tongue thereof, said tabs receiving substantially the width of the saw blade therebetween, and said transverse connector engaging said longitudinal slot of the blade; and
means drivingly connecting said blade with said motor so as to impart a reciprocating motion to the blade.

2. The reciprocating saw in accordance with claim 1 wherein the transverse connector is a longitudinal bar.

3. In a power-driven reciprocating saw comprising
a motor having a housing provided with a handle on one side and a rib on the other side thereof;
a blade support member secured at one end thereof in a rib of said motor housing and projecting outwardly therefrom, and provided with a central tongue along the lower longitudinal edge thereof;
and a saw blade having cutting teeth situated along the lower longitudinal edge thereof, and provided with a groove on the uppermost edge thereof, and upwardly projecting coplanar lugs along the uppermost longitudinal edge thereof, said tongue of the support member engaging the groove of said blade and bearing thereagainst, said lugs engaging said support member and lapping alongside the tongue thereof, and means drivingly connecting said blade with said motor so as to impart a reciprocating motion to the blade, the improvement which comprises
providing at the outer end of the blade support member a blade holder which comprises a pair of juxtaposed tabs for receiving a saw blade therebetween, affixing to and depending from the support member, and a transverse connector integral with said tabs and spaced from the blade support member, said tabs and transverse connector integral therewith defining an open-ended longitudinal slot at the outermost end of the saw blade, said tabs receiving substantially the width of the saw blade therebetween, and said transverse connector engaging said longitudinal slot of the blade.

4. A saw-blade support member for a power-driven reciprocating saw which comprises a blade support member having
a. means at one end of said blade support member to secure the blade support member to a motor housing;
b. a central tongue along one longitudinal edge thereof;
c. a blade holder positioned at the outer edge of the blade support member comprising a pair of juxtaposed tabs for receiving substantially the width of a saw blade therebetween, and a transverse connector integral with said tabs, said transverse connector being spaced from the blade support member to engage a longitudinal open-ended slot on the upper edge of a saw blade,
said tongue of the support member being adapted to engage the groove of a saw blade and bear thereagainst and extend longitudinally along the upper edge of a saw blade.

5. A saw blade support member for a power-driven reciprocating saw as defined in claim 4 wherein the transverse connector is a longitudinal bar.

* * * * *